United States Patent

Dadak et al.

Patent Number: 5,469,929
Date of Patent: Nov. 28, 1995

[54] MOTOR VEHICLE POWER STEERING GEAR

[75] Inventors: Tony M. Dadak, Birch Run; John L. Roberts, Frankenmuth, both of Mich.

[73] Assignee: General Motors Corporation, Detroit, Mich.

[21] Appl. No.: 415,805

[22] Filed: Apr. 3, 1995

[51] Int. Cl.$^6$ .................................................. B62D 5/083
[52] U.S. Cl. .................... 180/149; 91/375 R; 91/375 A; 180/DIG. 7
[58] Field of Search ..................................... 180/132, 149, 180/DIG. 4, DIG. 7, DIG. 6, DIG. 13, DIG. 18, DIG. 19; 91/375 A, 375 R

[56] References Cited

U.S. PATENT DOCUMENTS

| | | | |
|---|---|---|---|
| 3,170,535 | 2/1965 | Barton et al. | 180/148 |
| 3,273,465 | 9/1966 | Eddy | 91/375 A |
| 3,693,470 | 9/1972 | Masuyama | 74/499 |
| 4,339,986 | 7/1982 | Atkin | 91/375 A |
| 4,449,601 | 5/1984 | Adams | 180/148 |
| 4,488,475 | 12/1984 | Masuda et al. | 91/462 |
| 4,660,459 | 4/1987 | Bacardit et al. | 91/375 R |
| 4,759,259 | 7/1988 | Wurner et al. | 91/373 |
| 5,070,957 | 12/1991 | Harkrader et al. | 180/DIG. 7 |
| 5,213,174 | 5/1993 | Adams | 180/149 |
| 5,339,917 | 8/1994 | Eberhart | 180/149 |

Primary Examiner—Mitchell J. Hill
Attorney, Agent, or Firm—Saul Schwartz

[57] ABSTRACT

A motor vehicle power steering gear having a spool shaft connected to a steering wheel, a pinion head connected to a steered wheel, a torsion bar between the spool shaft and the pinion head, a control valve for regulating a hydraulic steering assist boost pressure in response to rotation of the spool shaft from an on-center position relative to the pinion head against a restoring force of the torsion bar, and a quiet preload apparatus including a C-shaped spring around the spool shaft having a pair of resilient jaws, a drive pin on the spool shaft clamped with a preload between the resilient jaws, and a cushioned abutment on the pinion head clamped with the preload between the resilient jaws. The cushioned abutment includes a pair of radial cantilever springs which flex upon engagement with corresponding ones of the resilient jaws during forced oscillation of the pinion head back and forth through the on-center relative position of the spool shaft to minimize audible noise associated with such engagements and a radial reinforcement between the cantilever springs which limits flexure thereof to minimize the effect of the cantilever springs on the performance characteristics of the control valve.

4 Claims, 4 Drawing Sheets

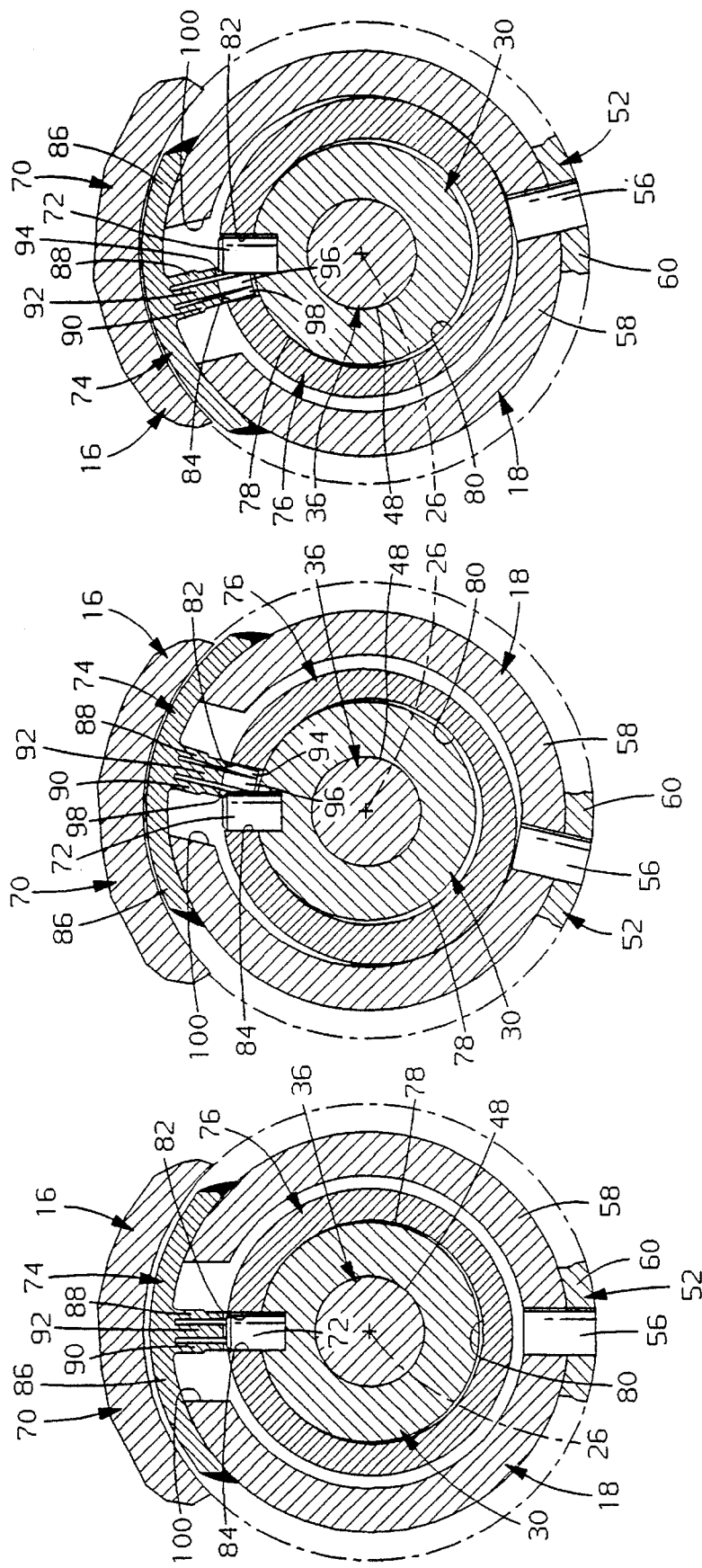

MOTOR VEHICLE POWER STEERING GEAR

FIELD OF THE INVENTION

This invention relates to motor vehicle power steering gears.

BACKGROUND OF THE INVENTION

U.S. Pat. No. 4,454,801, issued 19 Jun. 1984 and assigned to the assignee of this invention, describes a motor vehicle power steering gear having a spool shaft connected to a steering wheel of the vehicle, a pinion head connected to a steered wheel of the vehicle, and a torsion bar between the spool shaft and the pinion head. A steering assist hydraulic boost pressure is regulated by a control valve of the steering gear in response to rotation of the spool shaft from an on-center position thereof relative to the pinion head against a restoring force of the torsion bar. In some power steering gears, the onset of power assist is delayed by a preload apparatus which prevents rotation of the spool shaft from its relative on-center position until manual steering effort exceeds a preload. Typically, such preload apparatus includes a C-shaped spring having a pair of resilient jaws, a drive pin on the spool shaft clamped with a preload between the resilient jaws of the C-shaped spring, and a rigid abutment on the pinion head which is aligned with the drive pin in the relative on-center position of the spool shaft and, likewise, clamped with the same preload between the resilient jaws of the C-shaped spring. Such steering gears may encounter an operating condition in which the pinion head is forced by irregularities in the road surface to oscillate back and forth across the relative on-center position of the spool shaft. In that circumstance, the rigid abutment may audibly impact alternate ones the resilient jaws of the C-shaped spring as the pinion head is forced back and forth across the relative on-center position of the spool shaft.

SUMMARY OF THE INVENTION

This invention is a new and improved motor vehicle power steering gear including a spool shaft connected to a steering wheel, a pinion head connected to a steered wheel, a torsion bar between the spool shaft and the pinion head, a control valve for regulating a hydraulic steering assist boost pressure in response to rotation of the spool shaft from an on-center position relative to the pinion head against a restoring force of the torsion bar, and a quiet preload apparatus for delaying the on-set of rotation of the spool shaft from its relative on-center position until manual effort at the steering wheel exceeds a preload. The quiet preload apparatus includes a C-shaped spring around the spool shaft having a pair of resilient jaws, a drive pin on the spool shaft clamped between the resilient jaws of the C-shaped spring, and a cushioned abutment on the pinion head aligned with the drive pin in the relative on-center position of the spool shaft and likewise clamped between the jaws of the C-shaped spring. The cushioned abutment includes a first radial cantilever spring on the pinion head bearing against one of the jaws of the C-shaped spring, a second radial cantilever spring on the pinion head bearing against the other of the jaws of the C-shaped spring, and a rigid reinforcement on the pinion head between and separated from the radial cantilever springs. When the pinion head is forced to oscillate back and forth through the relative on-center position of the spool shaft, the first and second cantilever springs flex to cushion the impacts thereof on the corresponding jaws of the C-shaped spring. The rigid reinforcement between the cantilever springs limits flexure of each to minimize the effect of the cantilever springs on the performance characteristics of the control valve.

BRIEF DESCRIPTION OF THE DRAWINGS

FIGS. 5A–5C are similar to FIG. 2 but showing elements of the power steering gear according to this invention in a plurality of relative positions.

DESCRIPTION OF A PREFERRED EMBODIMENT

Figure 1:
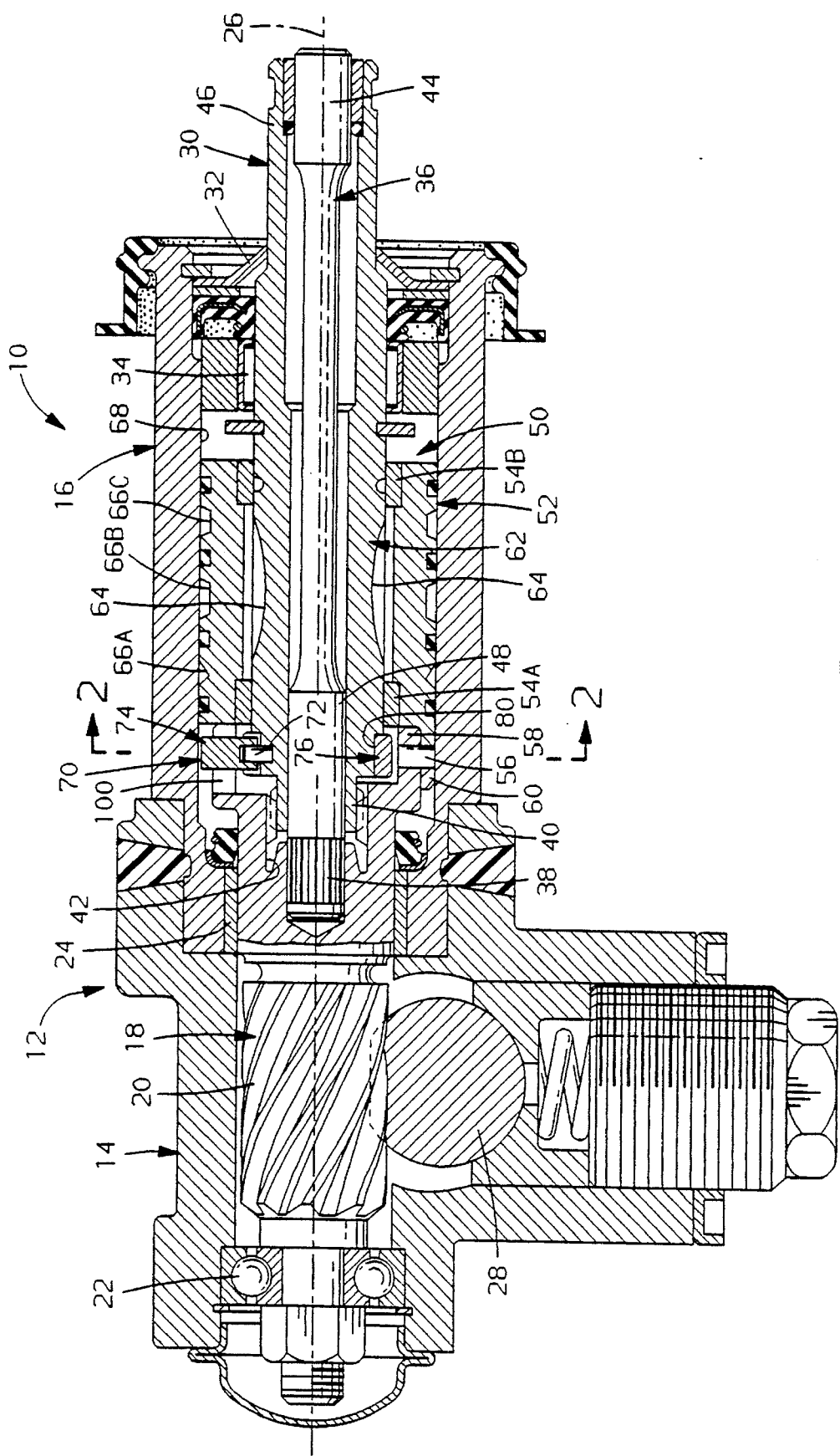
FIG. 1 is a longitudinal sectional view of a motor vehicle power steering gear according to this invention.

A motor vehicle power steering gear 10 according to this invention includes a housing 12 consisting of a rack housing 14 and a valve housing 16. A pinion head 18 having a plurality of gear teeth 20 thereon is supported on the rack housing 14 by a roller bearing 22 and by a sleeve bearing 24 for rotation about a centerline 26 of the steering gear. A rack bar 28 having a plurality of rack teeth meshing with the gear teeth 20 on the pinion head is supported on the rack housing 14 for bodily movement perpendicular to a the centerline 26 in response to rotation of the pinion head. The ends of the rack bar, not shown, are connected to steered wheels of the motor vehicle in conventional fashion.

A tubular spool shaft 30 of the steering gear protrudes into the valve housing 16 through a cover 32 on the valve housing and is supported on the valve housing for rotation about the centerline 26 by a bearing 34. A torsion bar 36 inside the tubular spool shaft has an inboard end 38 protruding beyond a corresponding inboard end 40 of the spool shaft force fitted in a serrated bore at the bottom of a counterbore 42 in the pinion head 18. An outboard end 44 of the torsion bar is rigidly connected to the spool shaft 30 at an outboard end 46 of the latter by a pin, not shown.

The inboard end 40 of the spool shaft 30 is supported on a cylindrical journal 48 of the torsion bar 36 for rotation about the centerline 26. The outboard end 46 of the spool shaft is connected to a manual steering wheel, not shown, of the motor vehicle for rotation as a unit therewith. Absent manual steering effort at the steering wheel, the torsion bar 36 locates the spool shaft 30 in an on-center position, FIGS. 2 and 5A, relative to the pinion head. A lost motion connection in the counterbore 42 between the spool shaft and the pinion head permits about 7.0° of twist of the torsion bar and corresponding rotation of the spool shaft in opposite directions from its relative on-center position.

A control valve 50 in the valve housing 16, similar to the valve described in the aforesaid U.S. Pat. No. 4,454,801, includes a tubular valve body 52 rotatably supported on the spool shaft by a pair of rings 54A–B on the valve body. A pin 56 on a cylindrical wall 58 of the pinion head is closely received in a radial bore in a skirt 60 of the valve body which extends part-way around the valve body whereby the valve body is connected to the pinion head for rotation as a unit therewith about the centerline 26. A valve spool 62 of the control valve 50 is defined by the portion of the spool shaft 30 between the rings 54A–B and includes a plurality of arc-shaped slots 64 facing a plurality of internal grooves, not shown, in the valve body and cooperating therewith in defining a plurality of throttling orifices, not shown, which open and close in response to relative rotation between the valve body and the spool shaft.

A plurality of outside annular grooves 66A–C on the valve body 52 are isolated from each other by seal rings on the valve body slidably engaging an inside cylindrical wall 68 of the valve housing. The grooves 66A, 66C are connected to opposite working chambers, not shown, of a steering assist fluid motor. The groove 66B is connected to a pump, not shown. In the relative on-center position of the spool shaft, all of the throttling orifices are equally open and fluid circulates at low pressure through the steering gear from the pump to a reservoir, not shown. The valve body and valve spool cooperate to regulate a steering assist boost pressure in response to rotation of the spool shaft 30 from its on-center relative position against the restoring force of the torsion bar.

As seen best in FIGS. 2–5, a quiet preload apparatus 70 of the steering gear is disposed between the spool shaft 30 and the pinion head 18 and includes a cylindrical drive pin 72, a T-piece 74, and C-shaped spring 76. The drive pin 72 is rigidly attached to the spool shaft 30 and projects radially outward from an outer cylindrical wall 78 of the spool shaft inside the cylindrical wall 58 of the pinion head. The C-shaped spring 76 has an inner cylindrical wall 80 facing the outer cylindrical wall on the spool shaft, a first resilient jaw 82, and a second resilient jaw 84 facing the first resilient jaw and clamping therebetween the drive pin 72.

Figure 3:
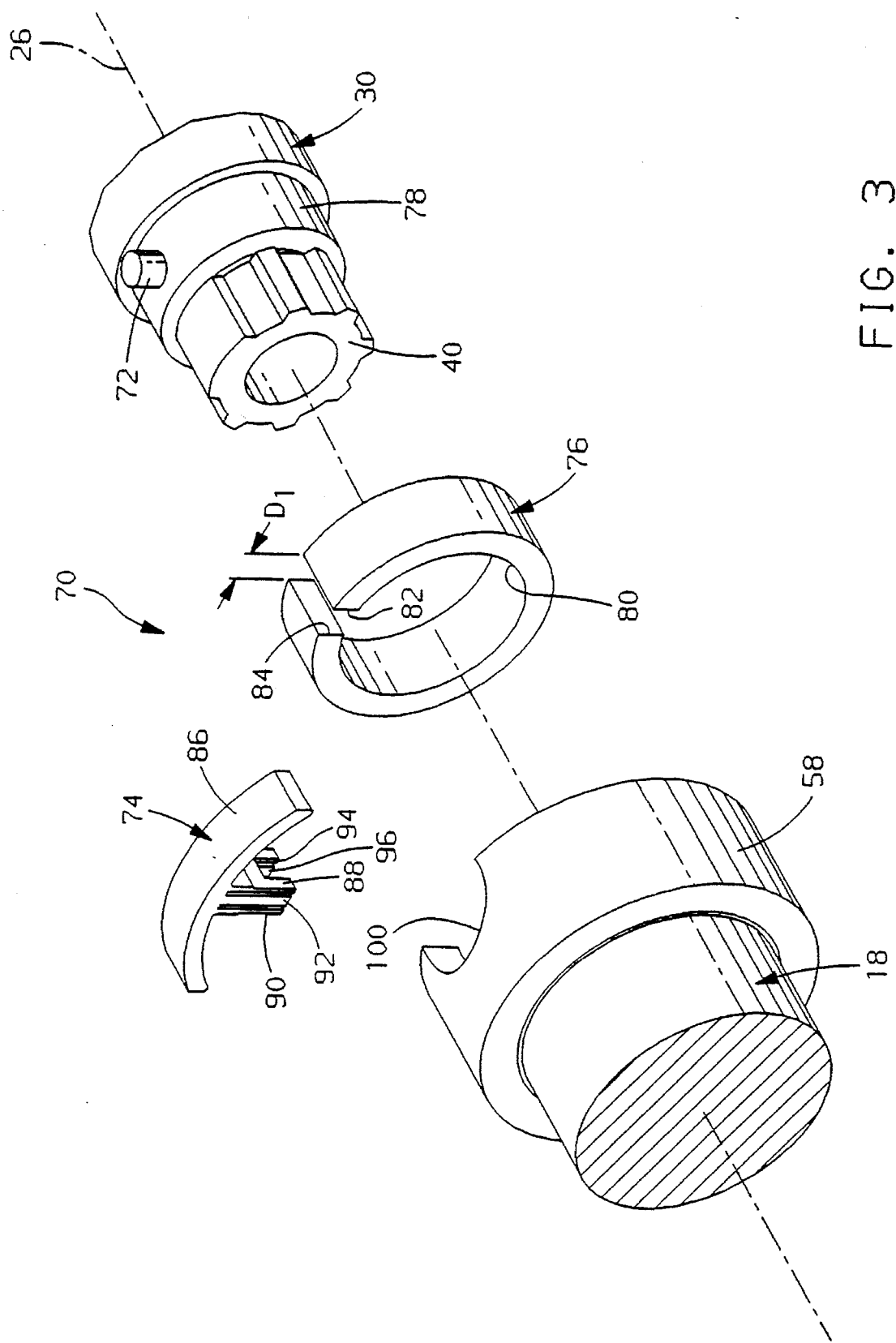
FIG. 3 is a fragmentary, exploded perspective view of a portion of FIG. 1.

In an unflexed condition of the C-shaped spring, FIG. 3, the first and second resilient jaws 82, 84 are separated by a minimum span dimension $D_1$ which is less than the diameter of the drive pin 72 so that the resilient jaws 82, 84 clamp the drive pin therebetween with a preload proportional to the degree of flexure of the C-shaped spring required to spread the resilient jaws to the diameter of the drive pin. With the first and second resilient jaws 82, 84 spread apart to the diameter of the drive pin 72, the diameter of the inner cylindrical wall 80 of the C-shaped spring exceeds the diameter of the outer cylindrical wall 78 so that the spool shaft 30 is rotatable relative to the C-shaped spring without significant drag therebetween.

Figure 4:
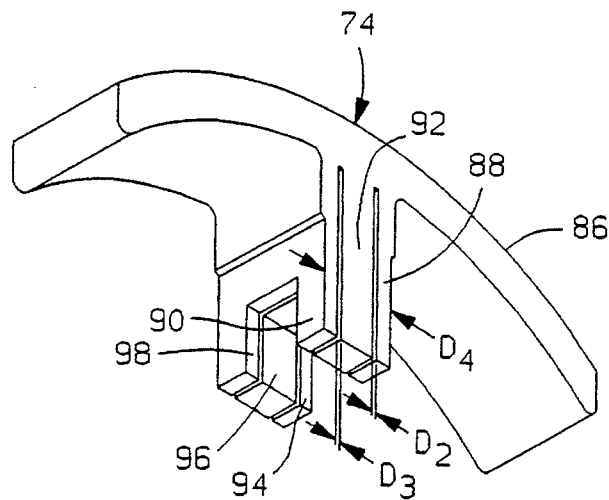
FIG. 4 is a perspective view of a portion of FIG. 3.

As seen best in FIG. 4, the T-piece 74 includes a curved crossbar 86 matching the curvature of the cylindrical wall 58 of the pinion head 18 and a radial abutment consisting of a first integral radial cantilever spring 88, a second integral radial cantilever spring 90, and an integral rigid reinforcement 92 between first and second radial cantilever springs. The first cantilever spring 88 is separated from the reinforcement 92 by a span dimension $D_2$ when the first cantilever spring is unflexed. The second cantilever spring 90 is separated from the reinforcement 92 by a span dimension $D_3$ when the second cantilever spring is unflexed. The length of each of the first and second cantilever springs 88, 90 and the reinforcement 92 corresponds to the radial separation between the cylindrical wall 58 of the pinion head and the outer cylindrical wall 78 on the spool shaft.

The first radial cantilever spring 88 has a notch 94 therein. The reinforcement 92 has a notch 96 therein aligned with the notch 94. The second radial cantilever spring 90 has a notch 98 therein aligned with the notches 94, 96. A dimension $D_4$, FIG. 4, of the T-piece between an outer extremity of each of the first and second cantilever springs 88, 90 when the cantilever springs are unflexed exceeds the diameter of the drive pin 72.

In assembling the steering gear 10, the relative on-center position of the spool shaft, i.e. relative to the pinion head, is established by hydraulically balancing the control valve 50. Then, the pin, not shown, is installed to connect the outboard end 44 of the torsion bar 30 to the outboard end 46 of the spool shaft. After that, the position of the T-piece 74 relative to the pinion head 18 is established by aligning the T-piece with a cutout 100 in the cylindrical wall 58 of the pinion head and forcing the first and second cantilever springs 88, 90 between the first and second resilient jaws 82, 84 of the C-shaped spring 76 with the drive pin 72 nested in, but not touching, the notches 94, 98 in the cantilever springs and in the reinforcement 92. The cantilever springs 88, 90 bear against the first and second jaws 82, 84, respectively. The position of the T-piece thus established is permanently captured by welding the crossbar 86 to the cylindrical wall 58, FIG. 2.

When the cantilever springs and reinforcement on the T-piece are forced between the resilient jaws 82, 84 of the C-shaped spring, a fraction of the preload of the resilient jaws flexes the cantilever springs 88, 90 toward the reinforcement 92 until the cantilever springs and the drive pin 72 are all clamped with the same preload between the resilient jaws. The span dimensions $D_2$, $D_3$ between, respectively, the cantilever springs 88, 90 and the reinforcement 92 exceed the initial flexure of the cantilever springs so that in the on-center relative position of the spool shaft 30 there is no interference between the cantilever springs 88, 90 and the reinforcement 92.

Figure 2:
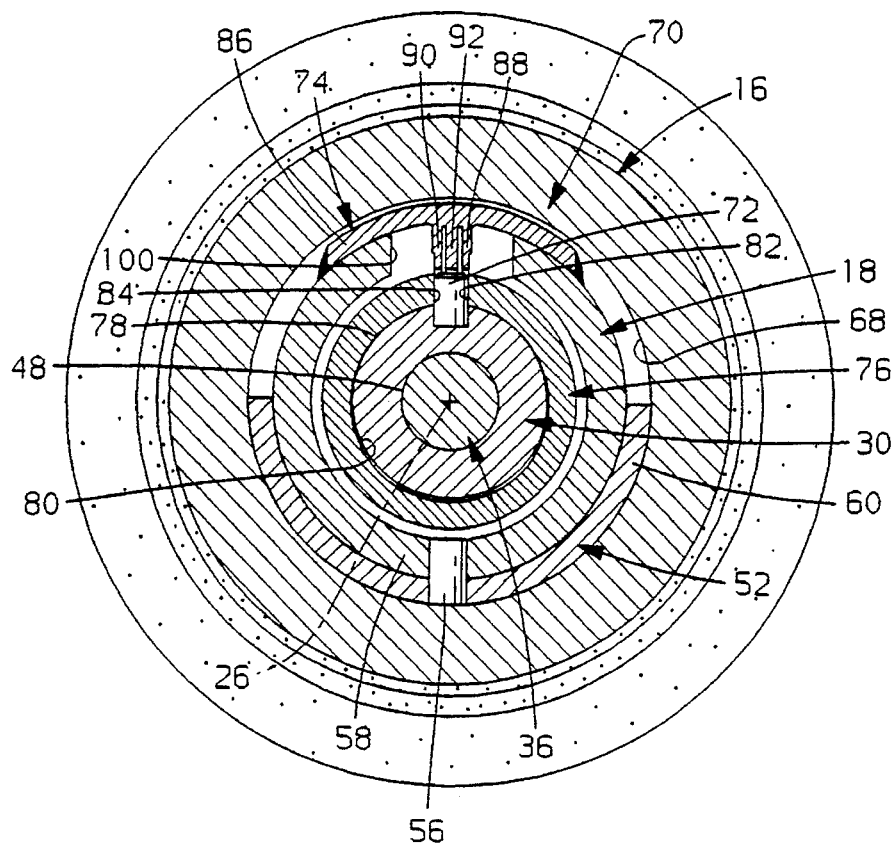
FIG. 2 is an enlarged sectional view taken generally along the plane indicated by lines 2—2 in FIG. 1.

The relative on-center position of the spool shaft 30, FIG. 2, corresponds to straight ahead driving. To steer, manual effort is applied at the steering wheel of the vehicle to rotate the spool shaft. Because the pinion head 18 resists such rotation due to its connection to the steered wheels of the vehicle, the manual effort applied at the steering wheel increases the force reaction between the drive pin 72 and one or the other of the resilient jaws 82, 84 and is transferred to the pinion head 18 through the other resilient jaw and through the corresponding one of the cantilever springs 88, 90.

Manual steering input to steer left, for example, increases the force reaction of the drive pin 72 against the first resilient jaw 82 and of the second resilient jaw 84 against the second cantilever spring 90 until either the pinion head commences to rotate clockwise, FIG. 2, or the preload exerted by the resilient jaws 82, 84 is exceeded and the drive pin 72 and second cantilever spring 90 commence spreading apart the resilient jaws. Conversely, manual steering input to steer right increases the force reaction of the drive pin 72 against the second resilient jaw 84 and of the first resilient jaw 82 against the first cantilever spring 88 until either the pinion head commences to rotate counterclockwise, FIG. 2, or the preload exerted by the resilient jaws 82, 84 is exceeded and the drive pin 72 and first cantilever spring 88 commence spreading apart the resilient jaws.

When resistance of the pinion head to steering corrections is low, e.g. when the vehicle is driven straight ahead at moderate to highway speed, the pinion head commences to rotate before the drive pin and one or the other of the cantilever springs commence spreading apart the jaws of the C-shaped spring. When the resistance of the pinion head to steering corrections is more substantial, e.g. when the vehicle is driven slowly, the drive pin and one or the other of the cantilever springs commence spreading apart the jaws of the C-shaped spring before the pinion head commences to rotate. Flexure of one or the other of the cantilever springs 88, 90 in either circumstance, however, corresponds to a range of angular positions of the spool shaft relative to the pinion head on opposite sides of the relative on-center position of the spool shaft in which the control valve 50 regulates a steering assist boost pressure proportional, in part, to the spring rate of the cantilever springs 88, 90.

The rigid reinforcement 92 minimizes the aforesaid range of angular positions of the spool shaft relative to the pinion head to more closely simulate manual steering, i.e. not power assisted, near the on-center relative position of the spool shaft. For example, when the vehicle is steered left, the force reaction of the second resilient jaw 84 against the second cantilever spring 90 flexes the latter toward the reinforcement 92. The spring rate of the second cantilever spring is calculated to accommodate flexure of the cantilever spring into engagement on the reinforcement except where resistance to rotation of the pinion head is minimal, e.g. when the steerable wheels of the vehicle are on ice. Thereafter, a rigid connection is established between the second jaw 84 of the C-shaped spring and the pinion head and the spring rate of the second cantilever spring 90 ceases to have any further effect on the performance characteristic of the control valve 50.

The span dimensions $D_2$, $D_3$ between the cantilever springs 88, 90 and the reinforcement 92, therefore, define the limits of the aforesaid range of angular positions of the spool shaft relative to the pinion head in which the spring rate of the cantilever spring influences the steering assist boost pressure regulated by the control valve 50. While it is only necessary that the span dimensions $D_2$, $D_3$ be equal to or exceed the initial flexure of the cantilever springs 88, 90 in the on-center relative position of the spool shaft, span dimensions $D_2$, $D_3$ equal to double the initial flexure of the cantilever springs 88, 90 in the on-center relative position of the spool shaft are preferable.

Referring to FIGS. 5A–5C, an operating condition has been observed in which the pinion head is forced by irregularities in the road surface to oscillate back and forth relative to the spool shaft 30 through the relative on-center position of the latter, FIG. 5A. For example, such oscillation may result, first, in the first jaw 82 of the C-shaped spring 76 being spread apart from the second jaw 84 by the first cantilever spring 88, FIG. 5B, and then, second, the second jaw 84 of the C-shaped spring 76 being spread apart from the first jaw 82 by the second cantilever spring 90, FIG. 5C.

As the pinion head 18 approaches the relative on-center position of the spool shaft 30 in the counterclockwise direction during such forced oscillation, the second radial cantilever spring 90 intercepts the second jaw 84 of the C-shaped spring 76 just ahead of the engagement of the first jaw 82 on the drive pin 72 and resiliently flexes to cushion the impact between the second cantilever spring and the second jaw. Likewise, in the opposite direction, the first cantilever spring 88 intercepts the first jaw 82 of the C-shaped spring 76 just ahead of the engagement of the second jaw 84 on the drive pin 72 and resiliently flexes to cushion the impact between the first cantilever spring and the first jaw. The aforesaid cushion effect of the cantilever springs 88, 90 suppress audible noise heretofore characteristic of such pinion head oscillation whether or not the force of engagement between the cantilever springs and the resilient jaws of C-shaped spring is sufficient to flex the cantilever springs against the reinforcement 92 as described above.

We claim:

1. A power steering gear for a motor vehicle including a tubular spool shaft connected to a manual steering wheel of said motor vehicle for rotation therewith about a centerline of said steering gear, a pinion head connected to a steered wheel of said motor vehicle and rotatable independently of said spool shaft about said centerline of said steering gear, and a torsion bar inside said spool shaft having a first end rigidly connected to said pinion head and a second end rigidly connected to said spool shaft biasing said spool shaft to an on-center position relative to said pinion head, characterized in that said steering gear includes a preload centering apparatus comprising:

a drive pin means rigidly connected to said spool shaft, a C-shaped spring disposed around said spool shaft having a first resilient jaw and a second resilient jaw cooperating in clamping said drive pin means therebetween with a resilient preload on said drive pin means, and an abutment means on said pinion head resiliently clamped between said first and said second jaws of said C-shaped spring with said resilient preload in said on-center relative position of said spool shaft including a first radial cantilever spring bearing against said first jaw and a second radial cantilever spring bearing against said second jaw and a radial reinforcement between said first and said second jaws separated from each by a span dimension calculated to limit flexure of said first and said second cantilever springs by engagement thereof-on said reinforcement during angular excursions of said spool shaft from said relative on-center position, each of said first and said second radial cantilever springs flexing upon an engagement with the corresponding one of said first and said second jaws of said C-shaped spring during forced oscillation of said pinion head through said on-center relative position of said spool shaft for cushioning said engagement and minimizing audible noise attributable to said engagement.

2. The power steering gear for a motor vehicle recited in claim 1 further comprising:

a notch in each of said first and said second radial cantilever springs and in said radial reinforcement in which said drive pin means is nested when said drive pin means and said abutment means are clamped between said first and said second jaws of said C-shaped spring with said resilient preload in said on-center relative position of said spool shaft.

3. The power steering gear for a motor vehicle recited in claim 2 wherein:

said drive pin is a cylindrical pin having a diameter less than a dimension of said abutment means between an outer extremity of each of said first and said second radial cantilever springs in an unflexed condition of each of said first and said second cantilever springs.

4. The power steering gear for a motor vehicle recited in claim 3 wherein said abutment means further comprises:

a crossbar rigidly attached said pinion head integral with each of said first and said second radial cantilever springs and with said radial reinforcement.

* * * * *